US012425346B2

(12) United States Patent
Gogolev et al.

(10) Patent No.: US 12,425,346 B2
(45) Date of Patent: *Sep. 23, 2025

(54) CONGESTION HANDLING IN TIME SENSITIVE NETWORKS THROUGH COORDINATION BETWEEN NETWORK SEGMENTS

(71) Applicant: ABB Schweiz AG, Baden (CH)

(72) Inventors: Alexander Gogolev, Dachau (DE); Johan Akerberg, Västerås (SE); Roland Braun, Niederkassel Lülsdorf (DE)

(73) Assignee: ABB Schweiz AG, Baden (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/393,217

(22) Filed: Dec. 21, 2023

(65) Prior Publication Data
US 2024/0129247 A1    Apr. 18, 2024

Related U.S. Application Data

(63) Continuation of application No. PCT/EP2022/066824, filed on Jun. 21, 2022.

(30) Foreign Application Priority Data

Jun. 28, 2021   (EP) ..................... 21182039

(51) Int. Cl.
*G06F 15/173*   (2006.01)
*H04L 43/0882*  (2022.01)
(Continued)

(52) U.S. Cl.
CPC ...... *H04L 47/2433* (2013.01); *H04L 43/0882* (2013.01); *H04L 43/55* (2022.05)

(58) Field of Classification Search
CPC .. H04L 47/2433; H04L 43/55; H04L 43/0882
See application file for complete search history.

(56) References Cited

U.S. PATENT DOCUMENTS

2009/0086708 A1*  4/2009  Pani .................. H04L 47/34
                                                    370/349
2018/0302331 A1* 10/2018  Bush ................. H04L 47/28
(Continued)

FOREIGN PATENT DOCUMENTS

| WO | WO 2016/110326 A1 | 7/2016 |
| WO | WO 2020/136487 A2 | 7/2020 |
| WO | WO 2021/018087 A1 | 2/2021 |

OTHER PUBLICATIONS

Gogolev et al., "A simpler TSN? Traffic Scheduling vs. Preemption," *2020 IEEE 25th International Conference on Emerging Technologies and Factory Automation (ETFA)*, pp. 183-189 (Sep. 9, 2020).

(Continued)

*Primary Examiner* — Duyen M Doan
(74) *Attorney, Agent, or Firm* — Leydig, Voit & Mayer, Ltd.

(57) ABSTRACT

A method for operating a time-sensitive network (TSN) includes splitting data stream on network elements into a "preempting" class and a "preemptable" class based on a mapping from priority labels; forwarding the data streams to respective next-hop network elements, wherein the forwarding of "preempting" data streams takes precedence over the forwarding of "preemptable" data streams; and forwarding the data streams received from both segments based on the priority labels and the classes of the data streams to at least one next-hop network element; wherein forwarding of "preempting" data streams takes precedence over forwarding of "preemptable" data streams; wherein the priority label attached to the data stream that has the highest priority is (Continued)

different from the priority label attached to the data stream that has the highest priority within the second segment.

15 Claims, 3 Drawing Sheets

(51) Int. Cl.
    *H04L 43/55*     (2022.01)
    *H04L 47/2425*     (2022.01)

(56) References Cited

U.S. PATENT DOCUMENTS

| | | |
|---|---|---|
| 2019/0007941 A1 | 1/2019 | Cavalcanti et al. |
| 2020/0136894 A1* | 4/2020 | Bush .................. H04L 1/08 |
| 2021/0227452 A1* | 7/2021 | Munz ................. H04L 41/0806 |
| 2021/0306910 A1* | 9/2021 | Guo .................... H04W 40/16 |
| 2022/0166677 A1* | 5/2022 | Jabbar ................. H04L 47/781 |
| 2023/0284077 A1* | 9/2023 | Pateromichelakis ... H04L 47/28 370/235 |

OTHER PUBLICATIONS

Gogolev et al., "TSN-Enabled OPC UA in Field Devices," *2018 IEEE 23rd International Conference on Emerging Technologies and Factory Automation (ETFA)*, pp. 297-303 (Sep. 4, 2018).

Gogolev et al., "TSN Traffic Shaping for OPC UA Field Devices," *2019 IEEE 17th International Conference on Industrial Informatics (INDIN)*, pp. 951-956 (Jul. 22, 2019).

Hirschmann, "Industrial HiVision—Network Management Software," downloaded from the Internet on Nov. 21, 2023, at https://www.belden.com/products/Industrial-Networking-Cybersecurity/Software-Solutions/Network-Management-Software/Industrial-HiVision-Network-Management-Software#numberOfResults=25, 3 pp. (2023).

Jeffree, "Admin/Oper parameters in P802.1Qbv," downloaded from the Internet on Nov. 24, 2023, at https://www.ieee802.org/1/files/public/docs2014/bv-admin-parameters-tony-jeffree-1214.pdf, 7 pp. (Dec. 11, 2014).

Nasrallah et al., "Ultra-Low Latency (ULL) Networks: A Comprehensive Survey Covering the IEEE TSN Standard and Related ULL Research," *arXiv—Cornell Univ. Library*, 59 pp. (Mar. 20, 2018).

Tttech Industrial, "Slate XNS," downloaded from the Internet on Nov. 21, 2023, at https://www.tttech-industrial.com/products/slate/slate-xns, 2 pp. (2023).

Yin et al., "Simulative Analysis of TSN-based Traffic Scheduling for In-vehicle Network," *2021 2nd International Conference on Artificial Intelligence and Information Systems (ICAIIS)*, 7 pp. (May 28-30, 2021).

European Patent Office, Extended European Search Report in European Patent Application No. 21182039.4, 13 pp. (Dec. 23, 2021).

European Patent Office, International Search Report in International Patent Application No. PCT/EP2022/066824, 5 pp. (Aug. 24, 2022).

European Patent Office, Written Opinion in International Patent Application No. PCT/EP2022/066824, 8 pp. (Aug. 24, 2022).

* cited by examiner

CONGESTION HANDLING IN TIME SENSITIVE NETWORKS THROUGH COORDINATION BETWEEN NETWORK SEGMENTS

CROSS-REFERENCE TO RELATED APPLICATIONS

The instant application claims priority to International Patent Application No. PCT/EP2022/066824, filed Jun. 21, 2022, and to European Patent Application No. 21182039.4, filed Jun. 28, 2021, each of which is incorporated herein in its entirety by reference.

FIELD OF THE DISCLOSURE

The present disclosure relates to time sensitive networks (TSN) and, more specifically, to TSN used as a communication medium in distributed control systems (DCS) in industrial plants.

BACKGROUND OF THE INVENTION

Distributed control systems, DCS, for an industrial plant comprise a plurality of controllers, sensors and actuators. Sensors may, for example, deliver measurement values from within an industrial process being executed on the plant. A controller may then, for example, communicate with actuators that physically act upon the process with the goal of keeping the measurement value (such as a temperature or a pressure) at a desired set-point value.

Communication within the DCS requires a fast and reliable delivery of data streams. Dedicated field bus networks are designed to provide the required low latency and reliability, but it is intended to replace multiple proprietary field bus systems with a standardized high performance network. For this purpose, time sensitive networks, TSN, that build upon traditional Ethernet networks are well-known in the art. WO 2020/136 487 A2 discloses a controller for process plants that is able to communicate in a network with a mixture of TSN devices and non-TSN devices. Configuration of a TSN as a whole may be quite complex and time-consuming depending on the number of participants.

BRIEF SUMMARY OF THE INVENTION

In one general aspect, the present disclosure describes a partial automation of the configuration of a TSN. In one embodiment, the present disclosure describes a method for operating a TSN, and in another embodiment the present disclosure describes a method for configuring a TSN.

The disclosure describes a method for operating a time sensitive network, TSN. This TSN comprises at least a first, high-importance segment and a second, low-importance segment. The terms "high-importance" and "low-importance" are relative terms with respect to the concrete application at hand. In every application, there will be some data streams whose timely and reliable delivery is more critical than the delivery of other data streams. For example, a measurement value that is captured somewhere in an industrial process and is merely displayed somewhere in the control room is still important to some degree (otherwise it would not be measured in the first place). But the updating of this measurement value is less time-critical than the updating of a measurement value that is part of a closed feedback loop.

The segments are independent in that traffic within the first segment on the one hand and traffic within the second segment on the other hand pass through different sets of physical links in the TSN. The first segment and the second segment are connected by a border network element. The first segment is connected to a first port of the border network element, and the second segment is connected to a second port of the border network element. By means of a third and more ports, the border network element may connect the first and second segment to the outside world, i.e., further segments of the TSN, or the Internet.

BRIEF DESCRIPTION OF THE SEVERAL VIEWS OF THE DRAWING(S)

DETAILED DESCRIPTION OF THE INVENTION

Figure 1:
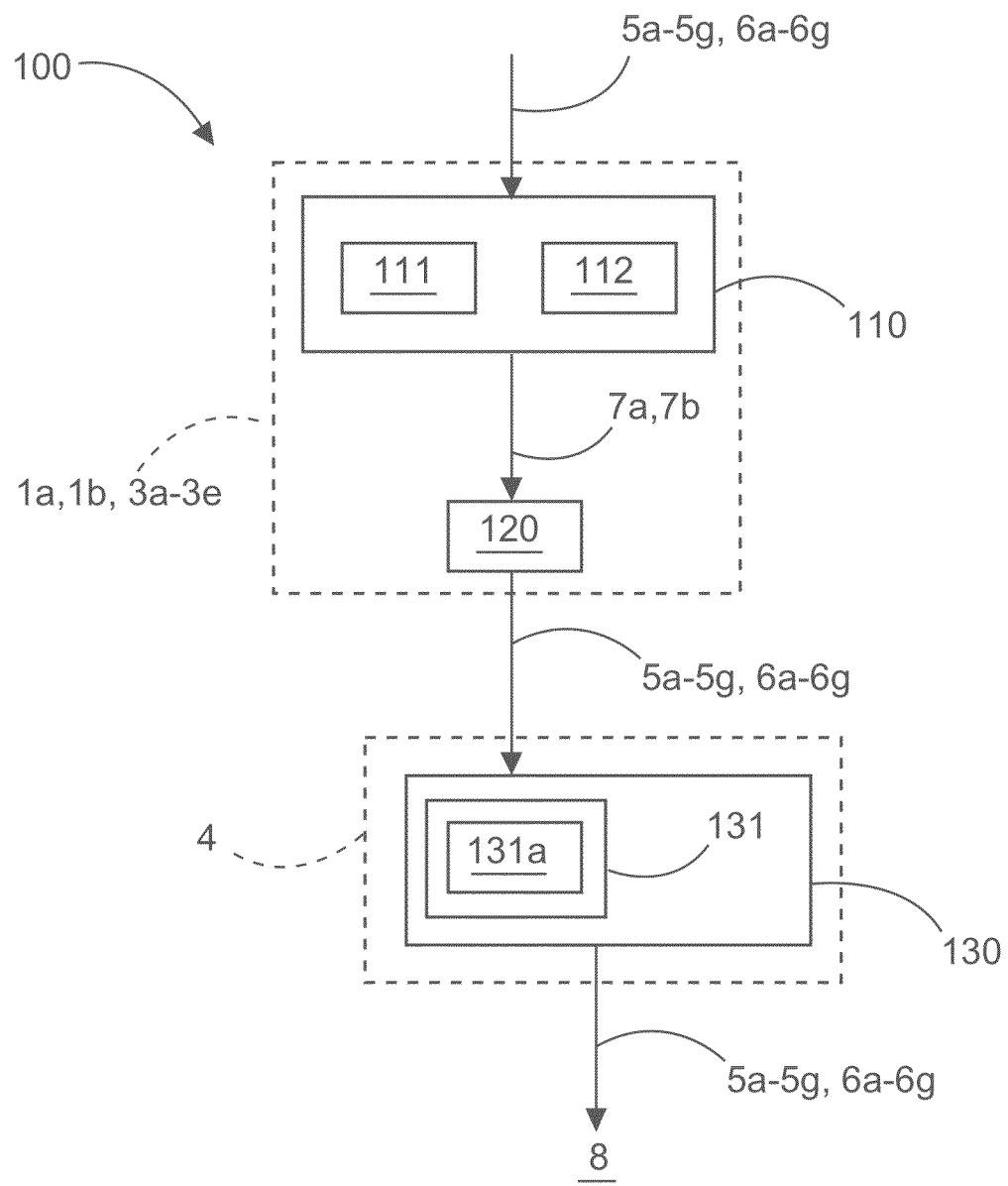
FIG. 1 is a block diagram of a method in accordance with the disclosure.
Figure 2:
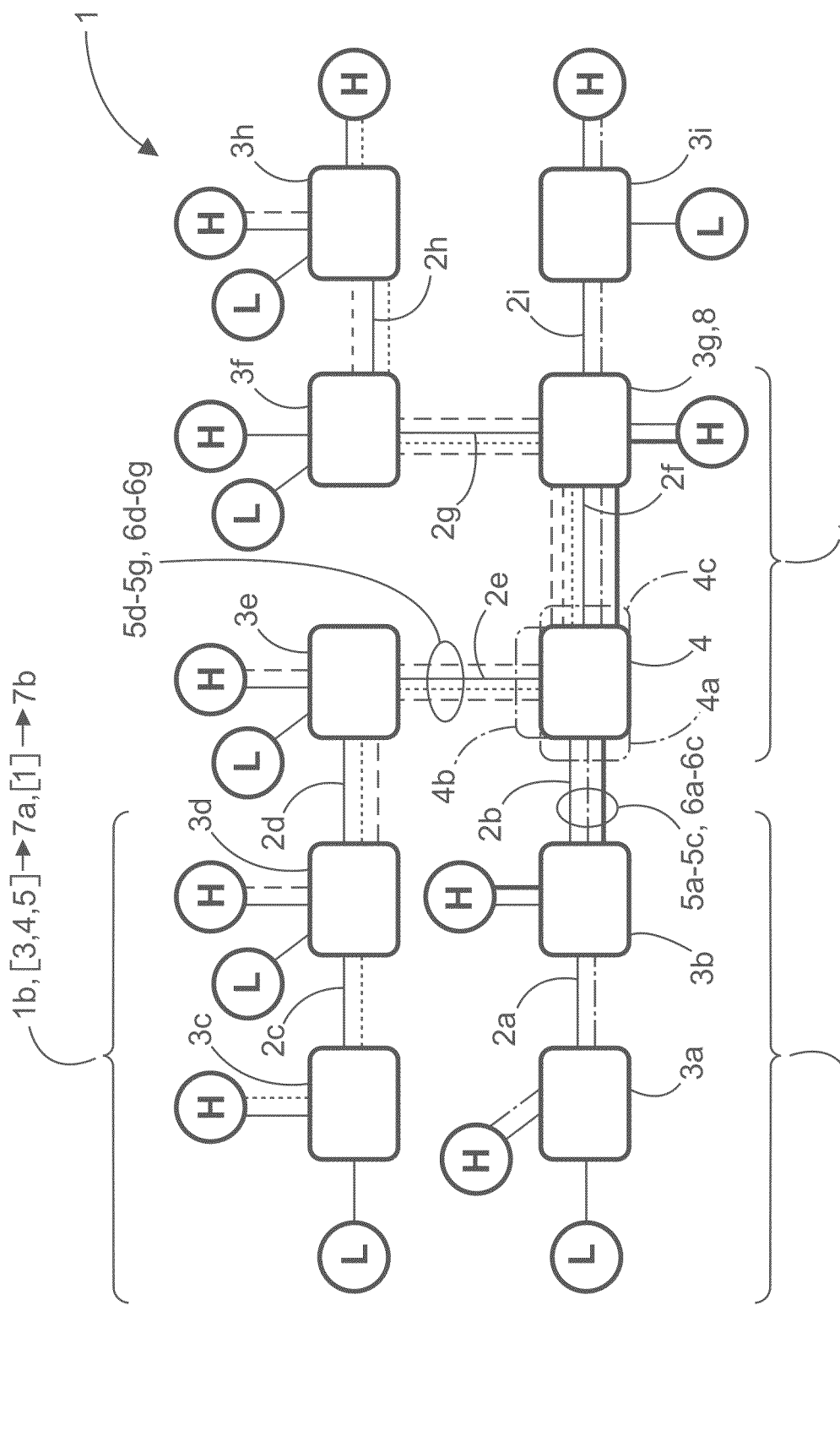
FIG. 2 is a block diagram of a network geometry in accordance with the disclosure.
Figure 3:
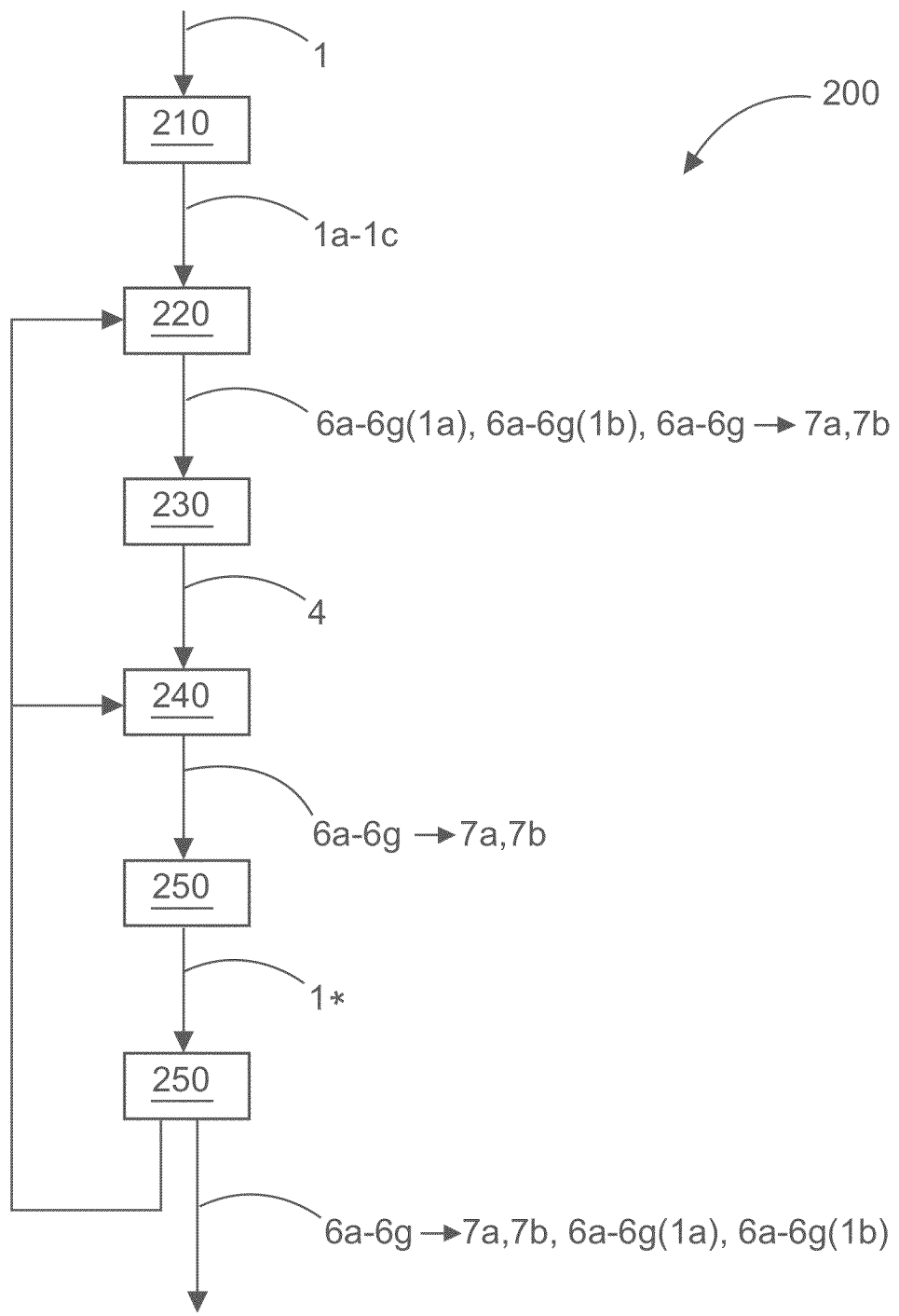
FIG. 3 is a flowchart for a method in accordance with the disclosure.

FIG. 1 shows an exemplary embodiment of the method 100 for operating a TSN 1. FIG. 2 illustrates an exemplary network geometry with congestion-prone segment 1c, and FIG. 3 shows an exemplary embodiment of the method 200 for configuring a TSN 1.

FIG. 1 is a schematic flow chart of an embodiment of the method 100 for operating the TSN 1. As it will be shown in FIG. 2 in more detail, the TSN 1 comprises network elements 3a-3i, 4 that are interconnected by physical links 2a-2i. The TSN 1 comprises a first, high-importance segment 1a with network elements 3a-3b and a second, low-importance segment 1b with network elements 3c-3e. The TSN 1 is configured to transport data streams 5a-5g to which priority labels 6a-6g are attached.

In step 110, network elements 3a-3e in the first segment 1a and the second segment 1b split data streams 5a-5g into a "preempting" class 7a and a "preemptable" class 7b based on a mapping from priority labels 6a-6g attached to these data streams 5a-5g to classes 7a, 7b.

The first segment 1a and the second segment 1b are coordinated in that: according to block 111, the priority label 6a-6g attached to the data stream 5a-5g that has the highest priority within the first segment 1a is different from the priority label 6a-6g attached to the data stream 5a-5g that has the highest priority within the second segment 1b; and/or according to block 112, the mapping between priority labels 6a-6g and classes 7a, 7b in the second segment 1b is different from the mapping between priority labels 6a-6g and classes 7a, 7b in the first segment 1a.

In step 120, the network elements 3a-3e forward data streams 5a-5g to respective next-hop network elements 3a-3e, 4. At least in case of congestion on a link 2a-2e to the respective next-hop network element 3a-3e, 4, the forwarding of "preempting" data streams takes precedence over the forwarding of "preemptable" data streams.

In step 130, the border network elements 4 forward the data streams 5a-5g received from both segments 1a, 1b to at least one next-hop network element 8 based on the priority labels 6a-6g and the classes 7a, 7b of the data streams 5a-5g. At least in case of congestion on a link 2f to the next-hop network element 8, the forwarding of "preempting" data streams 5a-5g takes precedence over the forwarding of "preemptable" data streams 5a-5g.

FIG. 2 shows an exemplary network geometry of a TSN 1. The TSN 1 comprises network elements 3a-3i, 4 that are interconnected by physical links 2a-2i. Network elements 3a and 3b with links 2a and 2b form a first, high-importance segment 1a. Network elements 3c, 3d and 3e with links 2c, 2d and 2e form a second, low-importance segment 1b. High priority stations H and low priority stations L in the first segment 1a produce data streams 5a-5c with priority labels 6a-6c. High priority stations H and low priority stations L in the second segment 1b produce data streams 5d-5g with priority labels 6d-6g.

The segments 1a and 1b are coordinated as to which priority labels 6a-6g they use, and how these priority labels 6a-6g are mapped to "preempting" class 7a and "preemptable" class 7b. In the first segment 1a, priority labels 6 and 7 are used for traffic that is highly important in the context of this first segment 1a, which is consequently mapped to the "preempting" class 7a by network elements 3a and 3b. Priority label 2 is used for traffic that is less important in the context of the first segment 1a. Consequently, this traffic is mapped to the "preemptable" class 7b by network elements 3a and 3b. In the second segment 1b, priority labels 3, 4 and 5 are used for traffic that is highly important in the context of this second segment 1b, which is consequently mapped to the "preempting" class 7a by network elements 3c, 3d and 3e. Priority label 1 is used for traffic that is less important in the context of this second segment 1b. Consequently, this traffic is mapped to the "preemptable" class 7b by network elements 3c, 3d and 3e.

Both segments 1a and 1b are connected to the border network element 4. The first segment 1a is connected to a first port 4a, and the second segment 1b is connected to a second port 4b of the network element 4. The border network element 4 forwards all data streams 5a-5g to the next-hop network element 3g, 8 to which it is connected via a third port 4c. The border network element 4 may use the priority labels 6a-6g and classes 7a, 7b of data streams 5a-5g as they are to decide over the order in which frames of the respective streams 5a-5g are transmitted. But the border network 4 may also, for example, remap priority labels 6a-6g to classes 7a, 7b.

Since all the data streams 5a-5g have to travel across one single physical link 2f between the border network element 4 and the next-hop network element 8, the segment 1c comprising the border network element 4, the next-hop network element 8 and the physical link 2f is a congestion-prone segment.

When the next-hop network element 3g, 8 forwards the data streams further on to other network elements 3f and 3i, it does so via multiple links 2g, 2i, so there is less propensity for a congestion of one of those links 2g, 2i.

FIG. 3 is a schematic flow chart of the method 200 for configuring the TSN 1, e.g., the TSN 1 shown in FIG. 2. In step 210, at least one segment 1c of the TSN 1 is identified that provides connectivity to or from at least a first further segment 1a and a second further segment 1b of the TSN 1. That is, a constellation of the first further segment 1a, the second further segment 2b, and the segment 1c that is needed by both segments 1a and 1b, is identified. As discussed before, the segment 1c is a congestion-prone segment because simultaneous high traffic going into and/or out or both segments 1a and 1b may overload it.

In step 220, the first further segment 1a and the second further segment 1b are configured such that: the priority label 6a-6g attached to the data stream 5a-5g that has the highest priority within the first segment 1a is different from the priority label 6a-6g attached to the data stream 5a-5g that has the highest priority within the second segment 1b; and/or the mapping between priority labels 6a-6g and classes 7a, 7b in the second segment 1b is different from the mapping between priority labels 6a-6g and classes 7a, 7b in the first segment 1a.

The result of this configuration is that in each segment 1a, 1b, it is established which priority labels 6a-6g will be used in the respective segment 1a, 1b, and how these priority labels 6a-6g will be mapped to "preempting" class 7a and "preemptable" class 7b by network elements 3a-3e of the respective segment 1a, 1b.

In step 230, a network element 4 that is connected to the first further segment 1a by a first port 4a, to the second further segment 1b by a second port 4b, and to the congestion-prone segment 1c by a third port 4c, is identified as a border network element 4. This border network element 4 is configured to remap data streams 5a-5g to classes 7a, 7b based on their priority labels 6a-6g.

In step 250, at least one key performance indicator 1* of the TSN is monitored and/or simulated. In step 260, the configuration of the first further segment 1a and the second further segment 1b, and/or the configuration of the border network element 4, is optimized with the goal of improving the key performance indicator 1*.

Data streams received on the first port and the second port have priority labels attached to them. These priority labels may, for example, be Time-Aware Traffic Shaping, TAS, priorities. According to the TSN standard, there are eight different TAS priorities.

In the course of the method, the network elements in the first and second segments split data streams into a "preempting" class and a "preemptable" class. To this end, priority labels that are attached to these data streams are mapped to classes. The network elements forward the data streams to respective next-hop network elements. This forwarding is based on the classes of the data streams in that, at least in case of congestion on a link to the respective next-hop network element, the forwarding of "preempting" data streams takes precedence over the forwarding of "preemptable" data streams.

The border network element receives the data streams from both segments. It forwards these data streams to at least one next-hop network element based on the priority labels and the classes of the data streams. At least in case of congestion on a link to the next-hop network element, the forwarding of "preempting" data streams takes precedence over the forwarding of "preemptable" data streams.

The first segment and the second segment are coordinated in that: the priority label attached to the data stream that has the highest priority within the first segment is different from the priority label attached to the data stream that has the highest priority within the second segment; and/or the mapping between priority labels and classes in the second segment is different from the mapping between priority labels and classes in the first segment.

In this manner, the determinism with which important data streams are forwarded by the border network element to the next-hop network element is improved. If there is no coordination between the first segment and the second segment, a first data stream in the first segment may have the same priority label and/or the same class as a second data stream in the second segment. In case of a congestion on the link between the border network element and the next-hop network element from the perspective of this border network element, frames from the two data streams will then compete for the forwarding because they are deemed equally important. Actually, the first data stream is more important by virtue of this data stream originating from the first, high-importance segment. But this is not reflected in the priority label and class on which the border network element bases the decision which frames are forwarded next and which frames have to wait. Apart from delays, this may also cause data loss because queues for frames that have to wait only have a finite size. The situation is comparable to that of a busy office worker who is trying to cope with a high inrush of e-mails. If everybody marks his e-mails with the "high priority" attribute in the hope that they will be read and replied to faster, then this "high priority" attribute loses its function as an aid to distinguish important e-mails from less important e-mails.

But with said coordination between the first segment and the second segment, the more important frames originating from the first segment become distinguishable from the less important frames originating from the second segment. In a simple case, the border network element may just take the priority labels and classes of the incoming data streams as they are. In more complex cases, as it will be discussed later, the border network element may perform further processing on the priority labels and classes before basing forwarding decisions on them.

The border network element may use any suitable kind of rule set or other pre-existing knowledge in order to discriminate between more important data streams and less important data streams based on the received priority labels and classes. For example, if the most important data stream in the first, high-importance segment has a particular priority label, then the border network element may be instructed to give precedence to data streams with this particular priority label. In the analogy of the e-mail inrush, the coordination between the first segment and the second segment might, for example, manifest itself in an instruction to company employees that the use of the "high priority" attribute of an e-mail is limited to managers from a certain rank up, and/or to employees from particularly critical departments. Everybody else has to use other "priority labels" to mark e-mails, such as writing "Action Required" followed by a deadline in the subject line.

In an advantageous embodiment, no priority label that is attached to a data stream in the first segment is also attached to a data stream in the second segment. In this manner, data streams originating from the first segment always occupy other priority queues on the border network element than data streams originating from the second segment.

In a further advantageous embodiment, the border network element remaps data streams to classes based on their priority labels. As discussed before, on top of the priority labels themselves, the border network element may exploit any other information or knowledge for this remapping. For example, a rule on the border network element may stipulate that data streams from certain sources, or to certain destinations, should always be in the "preempting" class. In another example, such a rule may stipulate that each network segment may contribute one data stream with a highest priority label to the set of data streams in the "preempting" class.

For example, the remapping may be based on the mapping between priority labels and classes in the first segment. This gives the highest precedence to the data streams that are deemed to be most important within the first segment. In particular, if the priority labels that are used in the first segment are not re-used in the second segment, no data stream from the second segment may make it into the "preempting" class.

In a further particularly advantageous embodiment, the mappings between priority labels and classes within the first and/or second segment on the one hand, and on the border network element on the other hand, are coordinated such that such that: no data stream that is in the "preemptable" class within the first and/or second network segment is in the "preempting" class upon forwarding from the border network element; and/or at least one system-important data stream is in the "preempting" class both within the first and/or second network segment and upon forwarding from the border network element.

In this manner, it avoided that a privileged handling of a data stream by virtue of being in the "preempting" class either in the first or second segment, or on the border network element, is "wasted" by non-privileged handling of the same data stream in the "preemptable" class somewhere else.

By virtue of having been in the "preemptable" class in its originating network segment before reaching the border network element, a data stream is already "tainted" with non-determinism. Transmission of this data stream can no longer be made highly deterministic by privileged handling on the border network element, just like a train that has already missed the time at which it should arrive at its final destination can no longer make this time by accelerating to full speed.

Likewise, if a system-important data stream is in the "preempting" class within the originating first and/or second network segment, then it should be processed in the "preempting" class by the border network element as well. Otherwise, the hard-earned determinism gained in the originating first and/or second network segment will be lost again, like the determinism of a train that has run a long a high-speed section of its journey perfectly on time is lost when this train then enters a section that it has to share with slower trains.

As discussed before, the TSN may be chosen to comprise controllers, sensors and actuators of a distributed control system, DCS, for an industrial plant as participants. In this manner, the TSN may take the place of a previous proprietary field bus network without sacrificing the determinism.

In the context of a DCS, at least one data stream that is part of a closed feedback loop of an industrial process may be chosen as a system-important data stream. Transmission of such data-streams is time-critical because an undue delay may cause the process to escalate beyond control. For example, a pressure in a vessel may rise beyond the physical limits of the vessel in a very short time if the measurement value of this pressure is delayed in the network and does not reach the controller in time to react, or if the command from the controller to open a relief valve is lost in the network and this valve is not opened.

In a further advantageous embodiment, memory for the queuing of frames of received data streams is allocated on the border network element such that queues for frames of "preemptable" data streams are able to accommodate more frames than queues for frames of "preempting" data streams. The border network usually stores received frames of data streams in a queue and forwards them according to the "first-in-first-out" (FIFO) principle. For example, there may be one queue per possible priority label. If there is congestion and one "preemptable" data stream has to wait for another "preempting" data stream, the queue for that priority label may fill up. Once the queue is full, either newly arriving frames for this queue may be dropped, or these newly arriving frames may cause the oldest frames at the front of the queue to be dropped. The larger the queue, the lesser the probability that data is lost in this manner. If there is a limited amount of queue space to work with, then it is advantageous to concentrate this on data streams that have a higher propensity of being left waiting. By contrast, highly prioritized "preempting" data streams do not need a large queue because the frames will not be waiting there for long. The sizes of the queues may furthermore be made dependent also on the updated priority labels of the data streams, which are a further indicator of the probability that frames of a particular data stream will have to wait to be transmitted.

The invention also provides a method for configuring a time sensitive network, TSN. This TSN comprises a plurality of network elements that are interconnected by links. The network elements are configured to forward data streams to respective next-hop network elements based on priority labels attached to the data streams.

The method starts with identifying at least one segment of the TSN that provides connectivity to or from at least a first further segment and a second further segment of the TSN as a congestion-prone segment. That is, a constellation of the first further segment, the second further segment, and the segment that is needed by both the first and the second further segments, is identified. In particular, if the available bandwidth in this segment is less than the combined bandwidths of the first and second further segments, simultaneous high activity in both further segments may overload the congestion-prone segment.

The first further segment and the second further segment are configured such that: the priority label attached to the data stream that has the highest priority within the first segment is different from the priority label attached to the data stream that has the highest priority within the second segment; and/or the mapping between priority labels and classes in the second segment is different from the mapping between priority labels and classes in the first segment.

In this manner, as discussed above, the TSN network is improved in that data streams from a more important network segment may take precedence over other data streams on the congestion-prone segment even if they are both labelled as "important" in the context of the respective first and second further network segments.

This configuration is not necessarily limited to the network elements that, together with the physical links, form the infrastructure of the first and second network segments. Rather, the configuration may also effect originating stations in the respective network segments. For example, these originating stations in one segment may be instructed only to use certain priority labels and no others.

The network elements may be instructed to perform certain mappings between priority labels and classes. But the network elements may also, for example, remap priority labels that originating stations in the respective network segment should not use to priority labels that should be used in this network segment. For example, some originating stations might lack a configuration option as to which priority labels they shall attach to outgoing data streams.

In an advantageous embodiment, the method further comprises identifying a network element that is connected to the first further segment by a first port, to the second further segment by a second port, and to the congestion-prone segment by a third port, as a border network element. This border network element is then configured to remap data streams to priorities based on their priority labels. As discussed before, this remapping may utilize any rules or other pre-existing knowledge as to which data streams are system-important.

The configuration may be performed in a fully automatic manner. The information about the geometry of the network is typically available in electronic form and may be parsed by machine. The originating stations and the network elements in the first and second further segments, as well as the border network element, may be configured by software. No manual engineering of the TSN as a whole is required. Any engineering that has already gone into the individual further network segments is not lost; rather, it is still present in the coordinated configuration of these further segments.

In a further advantageous embodiment, at least one key performance indicator of the TSN is monitored and/or simulated. The configuration of the first further segment and the second further segment, and/or the configuration of the border network element, is then optimized with the goal of improving the key performance indicator. For example, a plurality of candidate configurations of the remapping and/or the splitting may be set up, and for each such candidate configuration, the key performance indicator may be computed. A candidate configuration with the best value of the key performance indicator may then be implemented on the border network element.

In particular, the key performance indicator may comprise one or more of: a data throughput in the congestion-prone network segment; a latency of delivery of at least one data stream; a rate of frame loss of at least one data stream; and a measure for determinism of delivery of at least one data stream.

The optimizing for one or more key performance indicator may again be performed in a fully automatic manner. Thus, the fine-grained breakdown of the priority of data streams into 8 different priority labels as per the current TAS feature is no longer tied to a requirement for more manual configuration of the TSN as a whole. There is no longer a choice to be made between eight priorities and much manual configuration, or only two preemption classes and less manual configuration.

The methods may be wholly or partially computer-implemented. The invention therefore also provides one or more computer programs with machine readable instructions that, when executed on one or more computers, cause the one or more computers to perform one of the methods described above. In particular, a virtualization platform and one or more hardware controllers may be regarded as computers.

The disclosure also describes one or more non-transitory storage media and/or download products with the one or more computer programs. A download product is a product that may be sold in an online shop for immediate fulfillment by download. The invention also provides one or more computers with the one or more computer programs, and/or with the one or more non-transitory machine-readable storage media and/or download products.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B")

is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF REFERENCE SIGNS 1 time sensitive network, TSN
1a first, high-importance segment of TSN 1
1b second, low-importance segment of TSN 1
1c congestion-prone segment of TSN 1
1* key performance indicator of TSN 1
2a-2i physical links of TSN 1
3a-3i network elements in TSN 1
4 border network element in TSN 1
4a-4c ports of border network element 4
5a-5g data streams
6a-6g priority labels of data streams 5a-5g
6a*-6g* updated priority labels produced by border network element 4
7a "preempting" class for data streams 5a-5g
7b "preemptable" class for data streams 5a-5g
8 next-hop network element
100 method for operating TSN 1
110 splitting data streams 5a-5g into classes 7a, 7b in segments 1a, 1b
120 forwarding data streams 5a-5g within segments 1a, 1b
130 forwarding data streams 5a-5g to next-hop network element 8
131 allocating queue memory based on class 7a, 7b
131a allocating queue memory based on new labels 6a*-6g*
210 identifying congestion-prone segment 1c serving segments 1a, 1b 220 configuring further segments 1a and 1b
230 identifying border network element 4
240 configuring border network element 4
250 monitoring and/or simulating key performance indicator 1*
260 optimizing with the goal of improving key performance indicator 1*

What is claimed is:

1. A method for operating a time-sensitive network (TSN), comprising:
    providing a TSN, wherein the TSN comprises at least a first, high-importance segment and a second, low-importance segment such that traffic within the first segment and traffic within the second segment passes through different sets of physical links in the TSN;
    wherein the first segment is connected to a first port of a border network element that connects the first and second segments, and the second segment is connected to a second port of the border network element;
    splitting on network elements in the first and the second segments data streams into a "preempting" class and a "preemptable" class based on a mapping from priority labels attached to the data streams to classes;
    forwarding by the network elements the data streams to respective next-hop network elements wherein, at least in case of congestion on a link to the respective next-hop network element, the forwarding of "preempting" data streams takes precedence over the forwarding of "preemptable" data streams; and
    forwarding by the border network element the data streams received from both segments based on the priority labels and the classes of the data streams to at least one next-hop network element, wherein, at least in case of congestion on a link to the next-hop network element, the forwarding of "preempting" data streams takes precedence over the forwarding of "preemptable" data streams, wherein the priority label attached to the data stream that has the highest priority within the first segment is different from the priority label attached to the data stream that has the highest priority within the second segment; and
    wherein the mapping between the priority labels and the classes in the second segment is different from the mapping between priority labels and classes in the first segment.

2. The method of claim 1, wherein no priority label that is attached to a data stream in the first segment is also attached to a data stream in the second segment.

3. The method of claim 1, wherein the border network element remaps the data streams to the classes based on their priority labels.

4. The method of claim 3, wherein the remapping is based on the mapping between the priority labels and the classes in the first segment.

5. The method of claim 3, wherein the mappings between the priority labels and the classes within the first and/or the second segment and on the border network element are coordinated such that such that no data stream that is in the "preemptable" class within the first and/or the second network segment is in the "preempting" class upon forwarding from the border network element.

6. The method of claim 5, wherein at least one system-important data stream is in the "preempting" class both within the first and/or the second network segment and upon forwarding from the border network element.

7. The method of claim 1, wherein the TSN is chosen to comprise controllers, sensors and actuators of a distributed control system (DCS) for an industrial plant as participants.

8. The method of claim 6, wherein at least one data stream that is part of a closed feedback loop of an industrial process being executed in an industrial plant is chosen as a system-important data stream.

9. The method of claim 1, further comprising allocating on the border network element memory for queuing of frames of received data streams such that queues for frames of "preemptable" data streams are configured to accommodate more frames than queues for frames of "preempting" data streams.

10. The method of claim 9, further comprising making sizes of the queues dependent also on the updated priority labels of the data streams.

11. A method for configuring a time sensitive network (TSN), comprising:
providing the TSN, wherein the TSN comprises a plurality of network elements that are interconnected by links and configured to forward data streams to respective next-hop network elements based on priority labels attached to the data streams;
identifying at least one segment of the TSN that provides connectivity to or from at least a first further segment and a second further segment of the TSN as a congestion-prone segment;
configuring the first further segment and the second further segment such that:
the priority label attached to the data stream that has the highest priority within the first segment is different from the priority label attached to the data stream that has the highest priority within the second segment; and
a mapping between the priority labels and classes in the second segment is different from a mapping between priority labels and classes in the first segment.

12. The method of claim 11, further comprising:
identifying a network element that is connected to the first further segment by a first port to the second further segment by a second port and to the congestion-prone segment by a third port as a border network element; and
configuring the border network element to remap data streams to classes based on their priority labels.

13. The method of claim 11, further comprising monitoring and/or simulating at least one key performance indicator of the TSN.

14. The method of claim 13, further comprising optimizing a configuration of the first further segment and the second further segment, and/or a configuration of the border network element, to improve the key performance indicator.

15. The method of claim 13, wherein the key performance indicator comprises one or more of a data throughput in the congestion-prone network segment; a latency of delivery of at least one data stream; a rate of frame loss of at least one data stream; and a measure for determinism of delivery of at least one data stream.

* * * * *